United States Patent
Forstner et al.

(10) Patent No.: US 6,779,609 B2
(45) Date of Patent: Aug. 24, 2004

(54) HOOF GUARD

(75) Inventors: Karl Forstner, St. Joseph (AT); Michael Rohrmüller, Vienna (AT)

(73) Assignee: "Horse Shoe" Technologies Entwicklungs-und Vertriebs, Vienna (AT)

(*) Notice: Subject to any disclaimer, the term of this patent is extended or adjusted under 35 U.S.C. 154(b) by 0 days.

(21) Appl. No.: 10/446,119

(22) Filed: May 28, 2003

(65) Prior Publication Data

US 2003/0217851 A1 Nov. 27, 2003

Related U.S. Application Data

(63) Continuation of application No. PCT/AT01/00378, filed on Nov. 30, 2001.

(30) Foreign Application Priority Data

Dec. 1, 2000 (AT) .......................... 883/2000 U

(51) Int. Cl.[7] ................................. A01L 1/04
(52) U.S. Cl. .......................................... 168/4
(58) Field of Search ............................. 168/4

(56) References Cited

U.S. PATENT DOCUMENTS 3,782,473 A * 1/1974 Spencer .......................... 168/4
4,513,824 A * 4/1985 Ford ............................... 168/4
5,538,083 A   7/1996 Vindriis ........................ 168/6

FOREIGN PATENT DOCUMENTS

| DE | 3517119 A1 | * 11/1986 | ............. A01L/1/04 |
| EP | 0860115 A1 | 8/1998 | |
| FR | 2758944 | 8/1998 | |
| GB | 2262425 A | 6/1993 | |
| JP | 408214751 A | * 8/1996 | ............. A01L/1/04 |
| WO | WO99/40782 | 8/1999 | |

* cited by examiner

*Primary Examiner*—Son T. Nguyen
(74) *Attorney, Agent, or Firm*—Jacobson Holman PLLC

(57) ABSTRACT

A hoof guard for hooves of equestrian animals, especially for horse hooves, including a horseshoe-shaped base body, which has a walking side and a hoof application side. The hoof guard also includes at least two lifting devices, which can be displaced in or on the base body and which can be fixed to the base body. Each lifting device consists of a sliding part, which is mounted in or on the base body inside a depression or recess, and of a stop part, which projects away from the walking side while extending in an essentially perpendicular manner to the sliding part, and which rests against the hoof. The sliding part and the depression or recess of the base body are each provided with at least one complementary profile, which extends in the direction of displacement of the sliding part and which is provided for forming a slideway for the sliding part in or on the base body whereby enabling a simple adaptation to hooves of different shapes.

13 Claims, 5 Drawing Sheets

HOOF GUARD

The present application is a continuation application of PCT/AT01/00378, filed on Nov. 30, 2001.

FIELD OF THE INVENTION

The present invention relates to a hoof guard or hoof protection device for the hooves of riding animals and, in particular, horses, including a horseshoe-shaped base body having a running side and a hoof plating side as well as at least two adaptation or pull-up means capable of being displaced in or on the base body and fixed to the base body, said pull-up means being each composed of a sliding part mounted in or on the base body in a depression or recess thereof as well as a stop portion protruding substantially normally relative to the sliding part in the direction facing away from the running side for abutment on the hoof.

DESCRIPTION OF THE PRIOR ART

Various embodiments of hoof protection devices or hoof guards and horseshoes are known, wherein a plurality of known shoes, especially those made of metal, have predefined dimensions and are, therefore, not suitable for different riding animals and, in particular, horses. Thus, the adaptation of such horseshoes to different hoof sizes will, for instance, involve the dressing of such horseshoes and the production of an accordingly large number of horseshoes having different sizes so as to have available an accordingly large selection. If an improperly fit hoof protection is used, this will entail the risk of a rapid detachment of the hoof protection from the hoof, thus calling for accordingly frequent new shoeing.

In order to overcome those drawbacks of horseshoes and hoof protection configurations having predefined dimensions, it is known to provide pull-up means or clips which are at least partially displaceable or adjustable relative to the base body, reference in this respect being, for instance, made to FR-A 2 758 944 or WO 99/40782. In those multipart hoof protection structures, appropriate insertion elements render feasible the fixation of pull-up means in different positions on a base body through latching so as to ensure an adjustability enabling the adaptation to different hoof configurations.

EP 0 860 115 A1 discloses a hoof protection device aimed to improve the absorption of shocks exerted against the hoof, which hoof protection device comprises adaptation or pull-up means capable of being inserted in the sole region and, in particular, adjusted via saw-tooth sections.

SUMMARY OF THE INVENTION

The present invention aims to provide a hoof protection device of the initially defined kind, which offers additional options to properly and reliably adapt a hoof protection means to different hoof sizes, thus ensuring the proper fixation of a hoof protection device to a hoof.

To solve this object, the hoof protection device according to the invention is essentially characterized in that the sliding part and the depression or recess of the base body are each designed to comprise at least one complementary section extending in the direction of displacement of the sliding part for the formation of a slideway for the sliding part in or on the base body, and that said sections are comprised of undercut sections. The provision according to the invention, of a slideway between the sliding part and the depression or recess of the base body renders feasible the substantially continuous adaptation to different shapes and sizes of hooves that are to be equipped with hoof protection devices, so that the possibilities of adaptation of a hoof protection device according to the invention will be further enhanced. Simple sections will do to provide the desired slideway such that even the work involved in the manufacture of the hoof protection device according to the invention can be kept accordingly low. It is, thus, feasible to enable the appropriate adaptation to the most diverse hoof shapes substantially through the provision of a basic shape for the base body by appropriately adapting the position of the sliding parts of the pull-up means in or on the base body, wherein, upon fixation of the hoof protection to the hoof, possibly protruding elements of the base body can be removed in a simple manner such that, on the whole, the work involved in shoeing for the adaptation to different hoof shapes can be reduced by providing the appropriate base body sizes. Furthermore, the realization in the form of undercut sections prevents particularly undesired premature emerging.

While, in principle, a single slideway will do in each case by providing an appropriate section on the sliding part of the pull-up means and a complementary section in the region of the depression or recess on the base body, it is proposed according to a preferred embodiment that the sliding part has a substantially rectangular cross section normal to the direction of displacement and, on the two longitudinal sides extending in the direction of displacement, is formed with a section cooperating with a complementary section provided in the region of the lateral limitations of the recess or depression. By providing a guiding means on the longitudinal sides of the sliding part as well as accordingly complementary sections on the lateral limitations of the depressions or recesses, the safe and reliable guidance of the sliding part will be ensured without entailing the risk of the displaceable pull-up means canting or jamming during shoeing.

In order to enable a particularly simple and cost-effective manufacture, it is proposed according to a further preferred embodiment that the sections are comprised of dovetail sections, such dovetail sections ensuring an accordingly reliable guidance and, in particular, safely preventing the sliding part, or the entire pull-up means, from emerging normally to the direction of displacement.

In order to be able to safely prevent any unintentional emergence of the pull-up means in the direction of displacement during an adaptation procedure, it may be provided that the sliding part is capable of being received in the recess or depression by frictional engagement, as in correspondence with a further preferred embodiment of the hoof protection device according to the invention. Such a frictional engagement allows the sliding part to be displaced relative to the base body in or on the depression or recess via the slideway until the definite adaptation to the desired hoof size, since no extremely large forces will become necessary to overcome that frictional engagement.

Alternatively, or in order to support the correct positioning and avoid the unintentional emergence of a pull-up means in the direction of displacement during shoeing, another preferred embodiment contemplates that the sliding part, on its bottom surface facing the recess or depression, is formed with projections and/or depressions intended to cooperate with an accordingly sectioned abutment surface of the recess or depression. Such projections and/or depressions on the bottom surface of the sliding part can be designed in an accordingly simple and small manner in order to enable the safe provisional maintenance or positioning of the sliding part in an appropriate depression or recess of the base body during cooperation with a complementary section formed in the abutment surface. In this context, it is proposed according to another preferred embodiment that the sections of the bottom surface of the sliding part as well as the abutment surface of the recess are formed by latch toothings. Such latch toothings not only are particularly easy to produce, but also allow for the simple introduction of the sliding part by appropriate formation under consideration of the direction of displacement, wherein unintentional emerging in a sense opposite to the direction of insertion can be reliably prevented by providing an accordingly asymmetric design of the latches.

In order to ensure the proper fixation of the hoof protection device according to the invention to the hoof of a riding animal, it is, moreover, proposed that the base body comprises a plurality of holes or openings in the region of the recess or depression, substantially in the center and in the sense of the direction of displacement of the sliding part, to receive a fastening element and, in particular, a horse nail, as in correspondence with a further preferred embodiment of the hoof protection device according to the invention. By providing a plurality of holes or openings each intended to receive a fastening element, the fixation of the hoof protection device to the hoof can be readily realized upon adaptation by appropriate positioning of the pull-up means, since no respective material thickness of the base body need be penetrated by the fastening element and, in particular, horse nail. For the correct positioning of a horse nail or fastening element, it is, moreover, proposed in a preferred manner that the holes have cross sectional shapes and/or dimensions mating with horse nails.

In order to enable the avoidance of an emergence of the pull-up means during subsequent straining despite the optionally provided sections or toothings reliably preventing the unintentional emergence of said pull-up means during adaptation, a fastening element and, in particular, a horse nail is usually provided in the region of the displaceable pull-up means. In order not to be forced to penetrate an optionally provided larger material thickness of the sliding part of the pull-up means during the driving in or knocking in of a fastening element, it is, moreover, provided that the sliding part, substantially in its center and in the direction of displacement, is formed with a reduced material thickness zone extending at least over a partial region of the displacement path, as in correspondence with a further preferred embodiment of the hoof protection device according to the invention. By the substantially central arrangement of a reduced material thickness zone and the likewise proposed substantially central arrangement of a plurality of holes or openings for horse nails, the safe fixation of the hoof protection device after precise positioning of the pull-up means also in the region of the pull-up means, and hence the altogether final positioning of the pull-up means on the base body, will be safeguarded.

Bearing in mind the anatomy of a hoof to be equipped with a hoof protection device according to the invention, there are partial regions, particularly in the front region of the hoof, where no fastening element or horse nail must or may usually be driven in. In order to enable the fixation of a, particularly displaceable and hence adaptable, pull-up means to the hoof protection device or base body even in that region, it is proposed according to another preferred embodiment that the sliding part is provided with a notch or material taper substantially transverse to the direction of displacement on its upper side facing away from the base body and capable of being fixed in or on the base body on both sides of the notch by relatively angled partial regions of the sliding part. By enabling the angled arrangement or final positioning of the displaceable pull-up means on or in the base body, it will be ensured by assuming said angled position that any emergence can be excluded even in the absence of a fastening element or horse nail, particularly in cooperation with sections or latch toothings provided in the region of the bottom surface.

Since hoof size differences, as a rule, are most pronounced in a lateral region, it is proposed according to a further preferred embodiment that an adjustable pull-up means is each provided at an acute angle and, in particular, at about 30 to 60° relative to a central axis of the base body so as to obtain an accordingly good adaptability to different hoof sizes and shapes by such positioning of the displaceable or adjustable pull-up means.

Since the displaceable or adjustable pull-up means proposed according to the invention serve for the adaptation to different hoof sizes, a relatively far outwardly located position of a pull-up means may be required particularly with large hoof sizes. In order to prevent the sliding part or, in general, a partial region of the pull-up means from projecting beyond the lateral limitation of the base body and, thus, being damaged or sheared during walking or treading on bumpy ground, it is preferably proposed that the base body, in the region of the recess or depression intended to receive one adjustable pull-up means each, is formed with a protrusion projecting from the external periphery and, in particular, a protruding chamfer. Such protrusions or chamfers will, thus, ensure that no partial regions of the pull-up means will project beyond the lateral outer limitations of the base body of the hoof protection device irrespective of the actual installation position.

Especially when using a base body or hoof protection device made of a plastics material which, as opposed to metallic configurations of hoof protection devices, exhibits enhanced shock-absorbing properties, an accordingly high resistance to abrasion of the running side or sole of the hoof protection must be provided. In this context, it is proposed according to the invention that the base body is formed on its running side at least partially with a lining or coating made of a material of elevated resistance or abrasion resistance as against the material, particularly plastics material, of the base body, as in correspondence with a further preferred embodiment of the invention. It is, thus, feasible, to make the main region of the base body of an accordingly elastic or shock-absorbing material, while additionally attaching an accordingly more resistant or abrasion-proof running side to the base body.

SHORT DESCRIPTION OF THE DRAWINGS

In the following, the invention will be explained in more detail by exemplary embodiments schematically illustrated in the accompanying drawing. Therein:

Figure 5A:
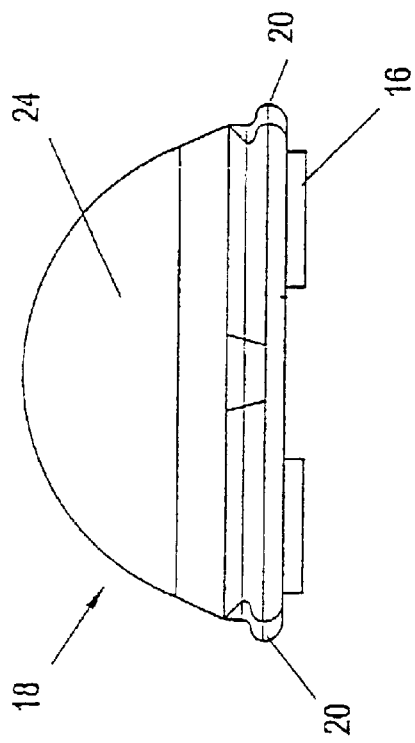
FIG. 5 shows detailed views on an enlarged scale, of a displaceable or adjustable pull-up means received in the hoof protection device according to FIG. 1, FIG. 5a being a front view of the pull-up means, FIG. 5b being a top view on the pull-up means, and FIG. 5c being a side view of the pull-up means.
Figure 6:
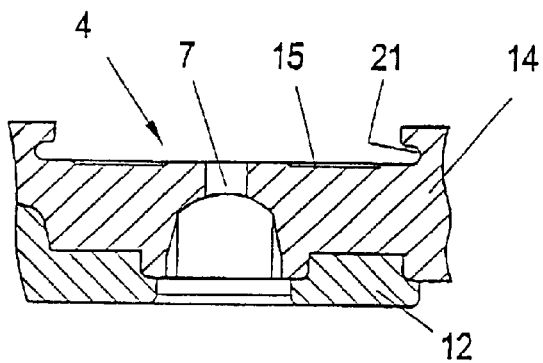
FIG. 6 is a partial section along line VI—VI of FIG. 1, likewise on an enlarged scale, of the region intended to receive a displaceable pull-up means.
Figure 7A:
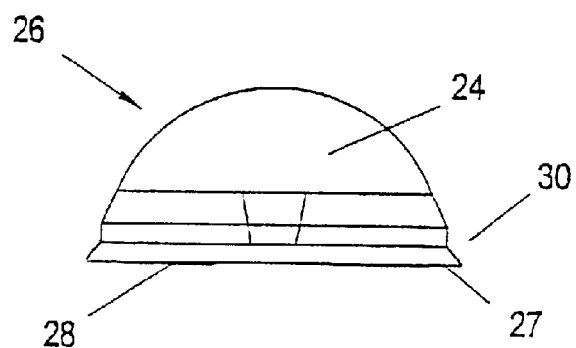
Figure 7B:
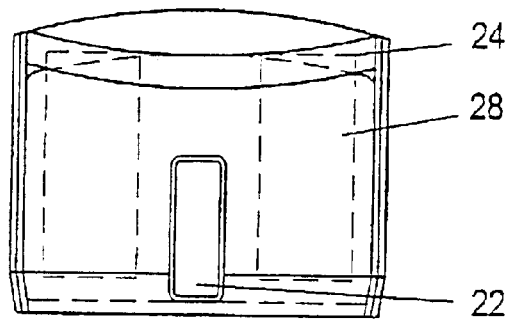
Figure 8:
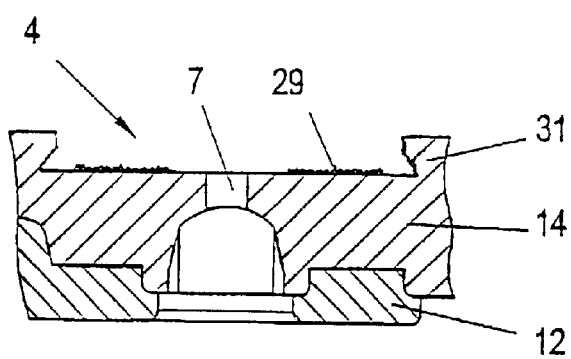

FIG. 7 in an illustration similar to that of FIG. 5 depicts a modified embodiment of an adjustable pull-up means of a hoof protection device according to the invention, FIG. 7a again being a front view and FIG. 7b a top view; and FIG. 8 in an illustration similar to that of FIG. 6 again shows a partial section through the region of reception of the pull-up means represented in FIG. 7, on the base body of a hoof protection device according to the invention.

DETAILED DESCRIPTION OF PREFERRED EMBODIMENTS

Figure 1:
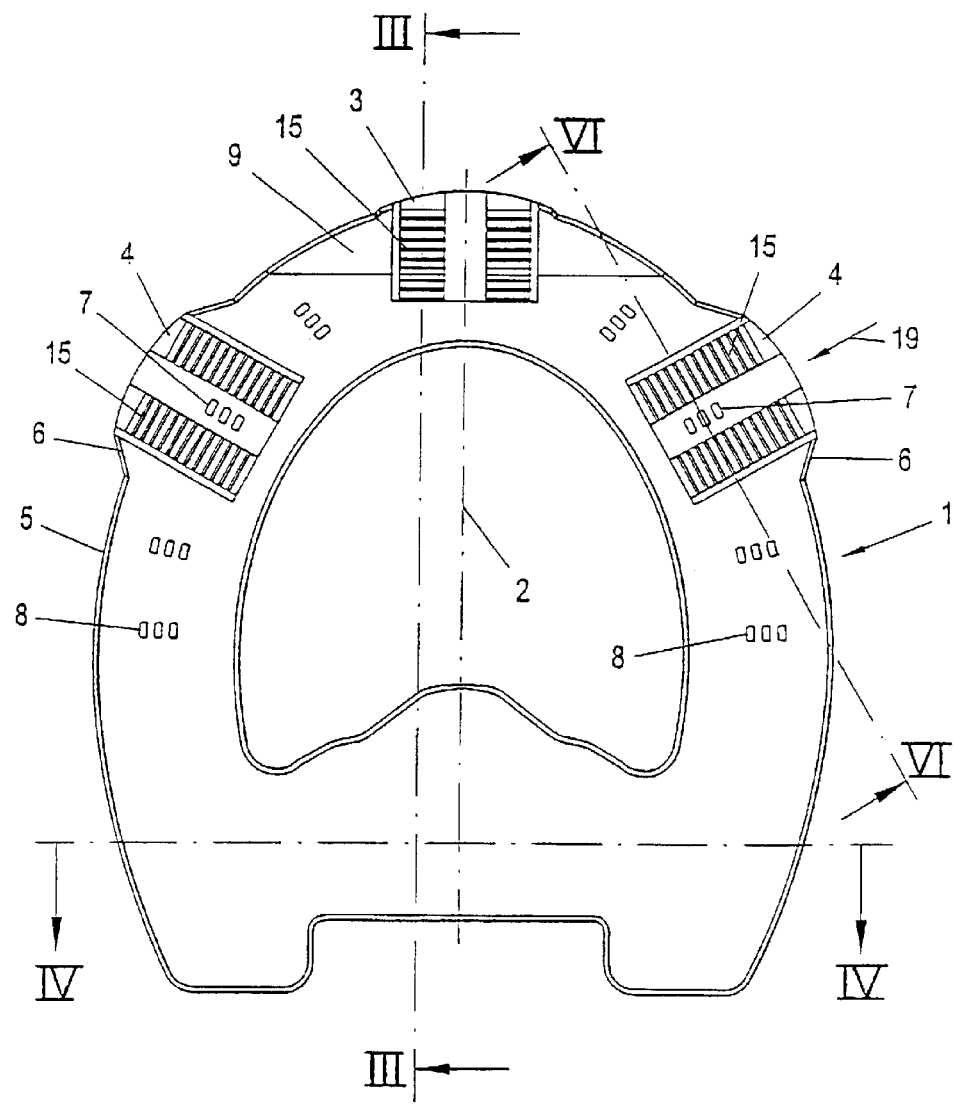
FIG. 1 is a top view on a first embodiment of a hoof protection device according to the invention.
Figure 2:
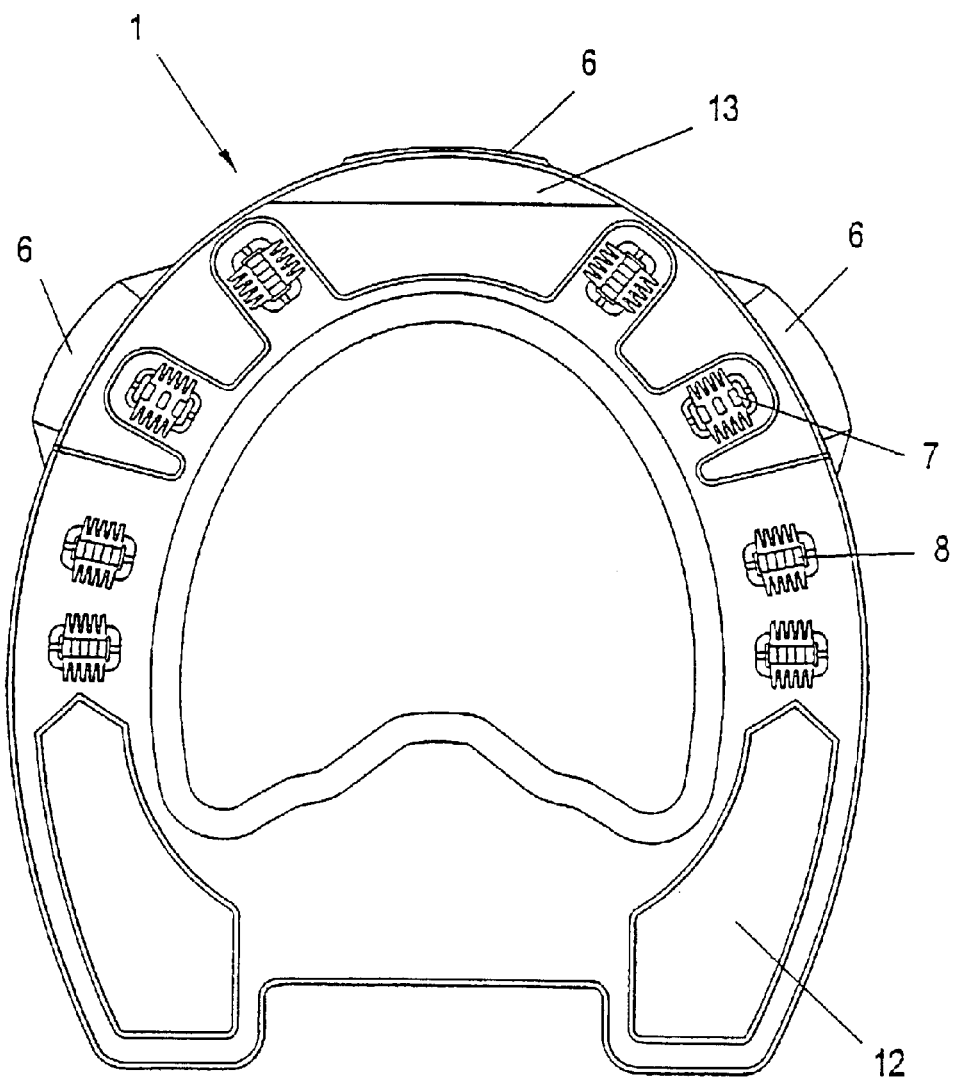
FIG. 2 is a view on the hoof protection device of the invention according to FIG. 1 from below.

In the illustrations according to FIGS. 1 and 2, a hoof protection device 1 is represented in top and bottom views, respectively, the shown hoof protection device 1 being, for instance, made of a plastics material. In the embodiment depicted in FIGS. 1 and 2, three depressions or recesses 3 and 4, respectively, are provided both in the front region of the hoof protection device 1, substantially centrally relative to the longitudinal axis 2, and at an acute angle relative to the longitudinal axis 2, which serve to receive adjustable or displaceable adaptation or pull-up means as are, for instance, illustrated in detail in FIGS. 5 and 7. In the region of the depressions or recesses 3 and 4, which are apparent in detail from the following Figures, the hoof protection device 1 comprises protrusions or chamfers 6 projecting from the external periphery 5 of the same and clearly visible, in particular, at the depressions or recesses 4 offset relative to the longitudinal axis 2 of the hoof protection device 1.

In order to fix the hoof protection device 1 to a hoof, a plurality of openings or holes 7 are provided in the region of the depressions or recesses 4 substantially in the center and in a substantially radial manner, into which a fastening element and, in particular, a horse nail can be subsequently introduced. Outside the regions 3 and 4 intended to receive the adjustable pull-up means, further openings or holes 8 for horse nails are indicated. By contrast, no opening or hole is provided in the region of the depression or recess 3 located along the longitudinal axis 2, because in that region no horse nail will usually be inserted. Moreover, the holes or openings 7 and 8 have outer contours mating with the cross-sectional shapes of the fastening elements or horse nails used.

Figure 3:
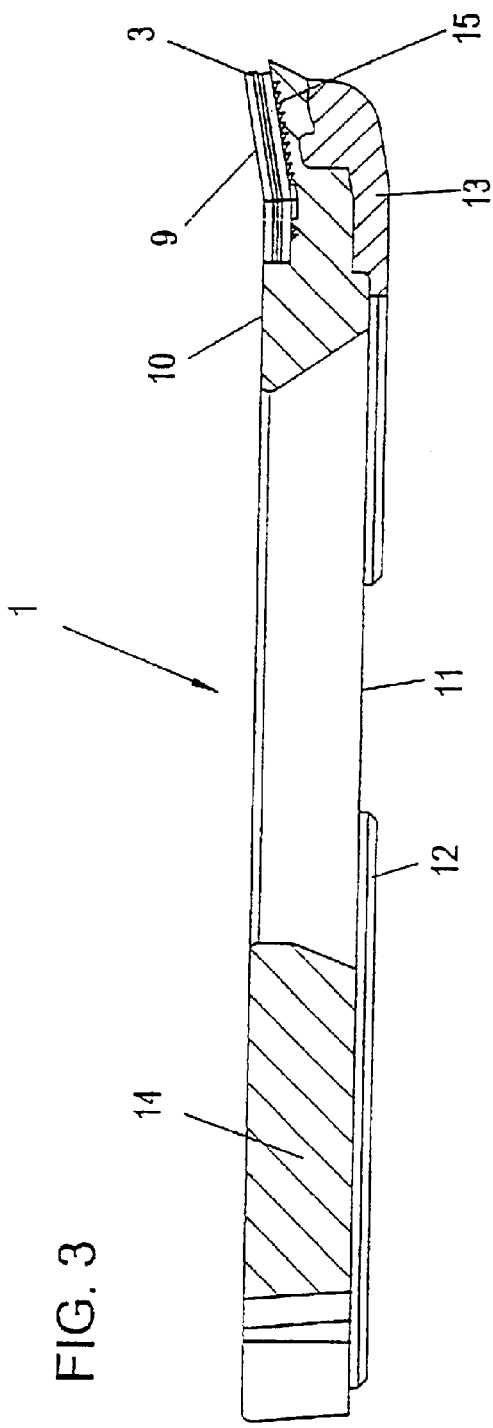
FIG. 3 is a section along line III—III, through the hoof protection device according to FIG. 1.

In order to properly fix a displaceable adaptation or pull-up means in the depression or recess 3 in which no horse nail is provided for the ultimate fixation, the recess or depression 3 is angularly designed, as is particularly apparent from the illustration according to FIG. 3. The hoof protection device 1 in its foremost portion has a region 9 which extends at an angle relative to the hoof plating side denoted by 10 such that the lateral limitation of the depression or recess 3 visible in FIG. 3 is accordingly angled too.

Figure 4:
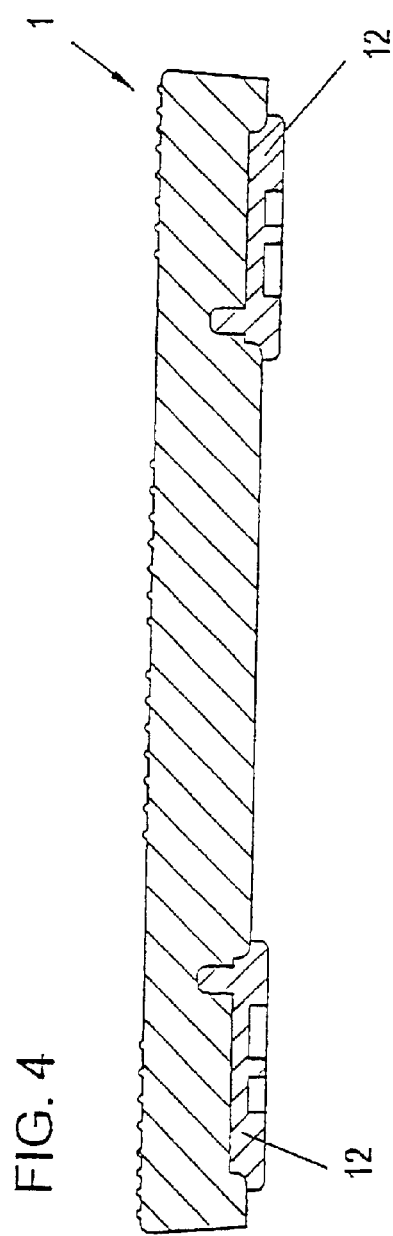
FIG. 4 is a section along line IV—IV, through the hoof protection device according to FIG. 1.

From the illustrations according to FIGS. 2, 3, and 4, it is furthermore apparent that additional linings or coatings 12 and 13, respectively, are provided in partial regions on the running side 11, which, in particular, are made of a material differing from that of the base body 14 and, in particular, being more resistant or abrasion-proof.

The recesses or depressions 3 and 4 illustrated in FIG. 1, moreover, comprise sections or profiles and, in particular, latch toothings 15 in the region of the plating surface, such a latch toothing 15 cooperating with a complementary section or latch toothing 16 formed on the bottom surface 17 of the displaceable adaptation or pull-up means 18, which is illustrated in more detail and on an enlarged scale in FIG. 5. The suitable formation and asymmetric arrangement of the individual teeth of the toothings 15 and 16 enable the simple introduction or insertion of such a pull-up means 18 in the sense of arrow 19 in FIG. 1, whereby unintended falling out of the pull-up means 18 is prevented by the toothings 15 and 16.

In order to enable the proper guidance of the pull-up means 18 in one of the depressions or recesses 3 and 4, respectively, which are illustrated in partial section on an enlarged scale in FIG. 6, the pull-up means 18 additionally comprises a section or profile 20 protruding from its lateral surfaces and received in an accordingly complementary section or profile 21 provided on the side walls of the recess or depression 3 and 4, respectively, in the direction of displacement. This slideway formed by sections 20 and 21 enables the safe introduction of a pull-up means 18 into one of the recesses 3 and 4, respectively, whereby falling out prior to the driving in of a nail or fastening element, which passes through a substantially central opening 7 in the region of the recess 4 and through a central region 22 of the pull-up means 18 of a reduced material cross section, will be prevented by the toothings 15 and 16.

FIG. 5, furthermore, indicates a stop portion 24 rising substantially normally from the slide portion 23 of the pull-up means 18, which extends substantially parallel with the plating surface 10 of the base body 14, which stop portion 24 will abut on the hoof to be shoed.

Figure 5B:
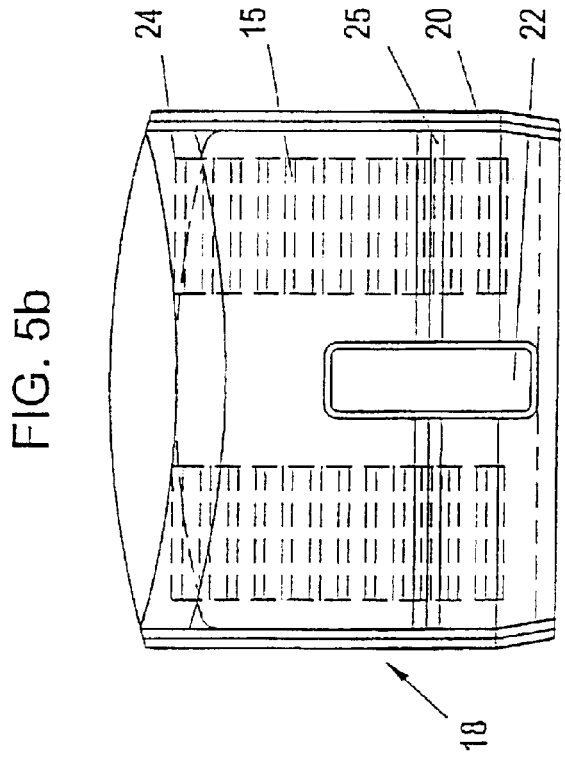
Figure 5C:
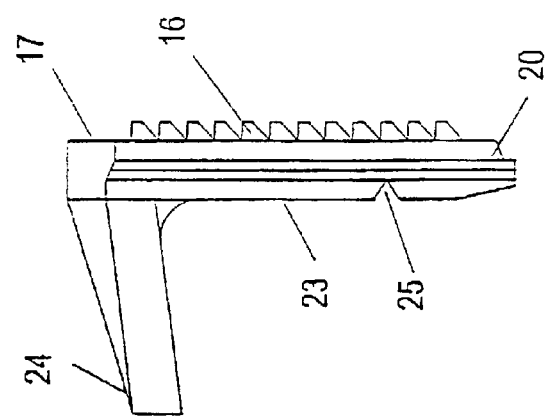

In order to enable the use of uniform pull-up means 18 in the region of the recesses or depressions 4, in which the ultimate fixation is realized by the aid of fastening elements or horse nails, as well as in the front central region within the recess or depression 3, which extends in an angled fashion, the pull-up means 18, as is clearly apparent from FIGS. 5b and 5c, on its surface facing away from the bottom surface 17 additionally comprises a notch 25 arranged in a manner mating with the relatively angled partial regions 9 and 10 of the plating surface of the hoof protection device 1 so as to likewise enable the safe anchorage of the pull-up means 18 by the driving in of the pull-up means 18 into the angled slideway of the recess or depression 3 and the weight brought about by treading after shoeing, even without providing a fastening element or horse nail.

FIG. 7 depicts a modified embodiment of an adaptation or pull-up means 26 in which, instead of the section or latch toothing, partial regions 28 having rough surfaces in the region of the bottom surface 27 are indicated to enable, along with accordingly rough partial regions 29, a frictional engagement aimed at the safe provisional retention of the pull-up means 26 after its introduction into a recess or depression 4 illustrated in FIG. 8.

The rounded sections 20 and 21 illustrated in FIGS. 5 and 6 for the formation of the slideway have, moreover, been replaced with undercut sections, for instance, in the manner of dovetail sections 30 and 31, respectively, in FIGS. 7 and 8 to again provide a slideway for the safe introduction of the pull-up means 26.

It goes without saying that instead of the provision in the configurations according to FIGS. 5 and 7, of protruding sections 20 and 30 on the pull-up means 18 and 26, respectively, and of correspondingly depressed sections 21 and 31 in the region of the recess or depression 4, the sections provided on the side walls of the recesses 3 and 4 may be protruding and cooperate with accordingly recessed or undercut sections provided on the lateral edges of the pull-up means 18 and 26, respectively.

It is, moreover, feasible, instead of providing complementary sections for the formation of slideways on the two lateral edges or walls of both the pull-up means 18 and 26, respectively, and the recesses or depressions 3 and 4, respectively, to provide an accordingly complementary section for the formation of a slideway in the region of the bottom surface of the pull-up means 18 and 26, respectively, and the abutment surface of an associated recess or depression 3 or 4, respectively, wherein it is essential to ensure, via the slideway or sections, particularly latch toothings, to be provided in addition, the at least provisional retention of the pull-up means 18 and 26, respectively, after their positioning in a recess 3 and 4, respectively, and prior to the final driving in of a fastening element.

What is claimed is:

1. A hoof protection device for the hooves of riding animals said hoof protection device comprising a horseshoe-shaped base body having a running side and a hoof plating side as eli as at least two adaptation or pull-up devices capable of being displaced relative to the base body and fixed to the base body, said pull-up devices being each composed of a sliding part mounted on the base body in a depression or recess thereof and a stop portion protruding substantially normally relative to the sliding part in a direction facing away from the running side for abutment on the hoof, the sliding art and the depression or recess of the base body each comprise at least one complementary interfitting track shaped section profile extending in a direction of displacement of the sliding part forming a slideway for in and out sliding of the sliding part on the base body, and said at least one complementary section is comprised of undercut track sections of the base body and the at least one complementary section of the sliding part being a track fitting with the undercut track sections and also extending in a longitudinal direction of the sliding part.

2. The hoof protection device according to claim 1, wherein the sliding part has a substantially rectangular cross section normal to the direction of displacement and, on the two longitudinal aides extending in the direction of displacement, is formed with a section cooperating with a complementary section provided in a region of lateral limitations of the recess or depression.

3. The hoof protection device according to claim 1, wherein the at least one complementary section is comprised of dovetail sections.

4. The hoof protection device according to claim 1, wherein the sliding part is received in the recess or depression by frictional engagement.

5. The hoof protection device according to claim 1, wherein the sliding part, on a bottom surface facing the recess or depression, is formed with at least one of projections and depressions to cooperate with an abutment surface of the recess or depression.

6. The hoof protection device according to claim 5, wherein sections of the bottom surface of the sliding part as well as the abutment surface of the recess are formed by latch toothings.

7. The hoof protection device according to claim 1, wherein the base body comprises a plurality of holes or openings in the region of the recess or depression, substantially in a center and in the direction of displacement of the sliding part, to receive a fastening element.

8. The hoof protection device according to claim 7, wherein the holes have at least one of cross sectional shapes and dimensions mating with horse nails.

9. The hoof protection device according to claim 1, wherein the sliding part, substantially in a center and in the direction of displacement, is formed with a reduced material thickness zone extending at least over a partial region of the displacement path.

10. The hoof protection device according claim 1, wherein the sliding part is provided with one of a notch and a material taper substantially transverse to the direction of displacement on an upper side facing away from the base body and being fixed on the base body on both sides of the notch by relatively angled partial regions of the sliding part.

11. The hoof protection device according to claim 1, wherein an adjustable pull-up device is provided at an acute angle relative to both sides of a central axis of the base body.

12. The hoof protection device according to claim 1, wherein the base body, in the region of the recess or depression to receive one adjustable pull-up device, is formed with a protrusion projecting from an external periphery.

13. The hoof protection device according to claim 1, wherein the base body is formed on a running side at least partially with a lining or coating made of a material of elevated resistance or abrasion resistance as against the material of the base body.

* * * * *